No. 841,364. PATENTED JAN. 15, 1907.
A. WICKWAR.
HANDLE OR KNOB FOR COOKING UTENSILS.
APPLICATION FILED DEC. 13, 1905.
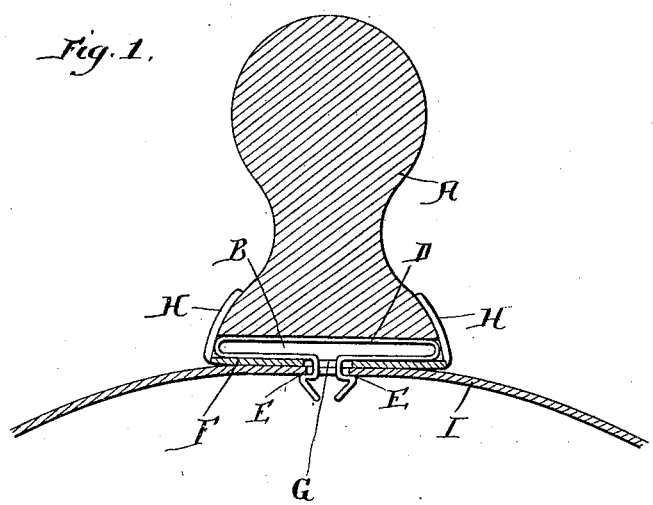
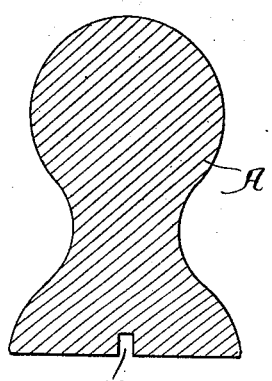
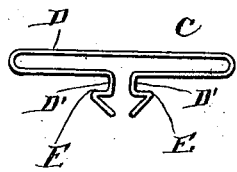
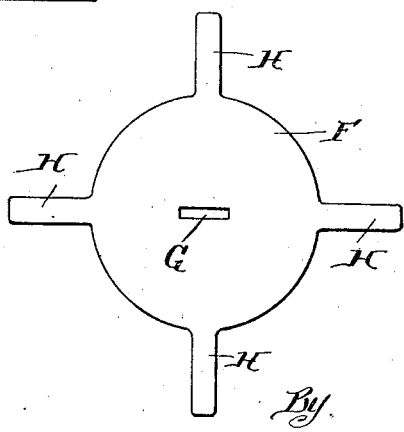
Witnesses
L. H. Momson
J. M. Gaskill
Inventor
Alfred Wickwar
H. B. Hallock
Atty

UNITED STATES PATENT OFFICE.

ALFRED WICKWAR, OF PHILADELPHIA, PENNSYLVANIA.

HANDLE OR KNOB FOR COOKING UTENSILS.

No. 841,364. Specification of Letters Patent. Patented Jan. 15, 1907.

Application filed December 13, 1905. Serial No. 291,526.

*To all whom it may concern:*

Be it known that I, ALFRED WICKWAR, a citizen of the United States, residing at Philadelphia, county of Philadelphia, and State of Pennsylvania, have invented a certain new and useful Improvement in Handles or Knobs for Cooking Utensils or the Like, of which the following is a specification.

My invention relates to a new and useful improvement in handles or knobs for cooking utensils and the like, and has for its object to provide a handle or knob for cooking utensils or the like which may be easily and quickly applied or removed from the article to which it is designed to be attached.

A further object of my device is to so construct the handle or knob that the same may be manufactured at a comparatively small cost and when once attached to the article for which it is designed as a handle or knob it will not become accidentally displaced from the same, but may be easily removed whenever it is desired to do so.

With these ends in view this invention consists in the details of construction and combination of elements hereinafter set forth and then specifically designated by the claim.

In order that those skilled in the art to which this invention appertains may understand how to make and use the same, the construction and operation will now be described in detail, reference being had to the accompanying drawings, forming a part of this specification, in which—

Figure 1 is a vertical section through my improved handle or knob, showing the same attached to the cover of a cooking utensil; Fig. 2, a vertical section through the knob or handle proper by itself, the section being taken at right angles to that shown in Fig. 1; Fig. 3, a side elevation of the wire latch or catch by which means the knob or handle is automatically attached to the cover of the cooking utensil; Fig. 4, a plan view of the plate designed to cover the bottom of the knob or handle and be attached to the knob or handle by the wings or fingers extending outward from the same.

The usual manner of attaching knobs or handles to the cover of cooking utensils and the like is to provide a wooden knob or handle having a vertical opening formed therethrough, through which is adapted to extend a screw-threaded bolt, the lower end of which bolt is adapted to extend through the cover of the cooking utensil, and a washer and nut are secured upon the lower end of said bolt; but the great disadvantage of this construction is that the nut is liable to work loose from the bolt and drop within the utensil and the knob become loose. My improved knob or handle is designed to be attached to the cover of the utensil automatically by simply pressing downward upon the same, and after it is so attached it cannot become accidentally displaced from the same unless some of the parts become broken.

A represents the knob or handle, which is composed, preferably, of wood or other material non-conducting to heat, and the lower portion of this knob or handle is preferably flattened, and across the lower portion is formed a slot or groove B.

C is the latch or catch for securing the handle to the utensil and composed of one piece of wire bent so as to form a loop D, said loop D being only of sufficient height or width to fit within the groove or slot B within the handle A, and the ends of the wire extend downward from near the center of the lower run of this loop D, said ends extending down vertically for a certain distance, and this vertical portion of the ends being normally separated from one another a slight distance, as shown in Fig. 3, the wire then being bent outward horizontally, so as to form the shoulders E, and then the ends of the wire are bent inward and downward toward one another, so as to be inclined; but these ends of the wire are so separated normally a distance from one another the same as the vertical portions of the latch or catch previously described.

F is a circular plate of substantially the same diameter as the lower flattened portion of the knob or handle A, and through the center of this plate is formed a slot G, through which the downwardly-extending portions of the catch C are adapted to extend. Thus the plate F will hold the elongated loop D of the catch C within the slot B, and this plate F may be secured to the handle A in any manner desired, a convenient means being here shown, as by providing the plate F with the ears or fingers H, adapted to be bent upward around the lower portion of the knob or handle, as shown in Fig. 1. The vertical portions D' of the wire catch are long enough and extend a sufficient distance below the plate F to allow space for the material composing the cover of the cooking utensil (represented at I) to enter between the plate F and the shoulders E of the catch.

In applying the handle or knob to a cover of a utensil an opening is formed through the top of the cover, which opening is smaller in diameter than the distance between the outer ends of the shoulders E when the catch is in its normal position; but said opening through the cover is large enough to emit the passage of the shoulders E through the opening when the two ends of the wire catch are pressed together. Thus when the parts of the knob or handle are assembled it is simply necessary to insert the inclined ends of the wire catch within the opening of the cover of the utensil and press downward, and on account of the ends of the catch being inclined said ends will be pressed together until the shoulders E will pass through the opening in the cover of the utensil. Then the ends of the catch will spring apart and the knob will be locked in place and cannot again be removed until the ends of the catch are pressed together and the knob lifted up.

It will be seen by the foregoing description that I have provided an improved knob or handle for cooking utensils and the like which may be manufactured at a comparatively small cost, which may be attached to any cover of any utensil easily and quickly, and will not be accidentally detached from the same, but can be just as easily and quickly removed at any time desired.

In the old form of attaching the knob or handle by means of a bolt and nut the nut is very liable to become rusted and so attached to the bolt that it cannot be easily removed; but with my improved device when the utensil has become useless the knob can be easily detached therefrom and saved for another utensil.

Of course I do not wish to be limited to the exact construction herein shown, as slight modifications could be made without departing from the spirit of my invention.

Having thus fully described my invention, what I claim as new and useful is—

In a device of the character described, a knob or handle being flattened at the lower end, a transverse groove formed across the lower surface of the knob or handle, a spring-catch consisting of one piece of wire bent so as to form an elongated loop adapted to lie within the groove formed in the handle, the ends of the wire composing the loop approaching one another but not meeting near the center of the lower run of the loop, said ends then being bent downward vertically for a slight distance, each of said ends then being bent outward horizontally in opposite directions from one another to form shoulders, then being bent downward and inward toward one another, a plate adapted to fit over the lower end of the knob, said plate being provided with an opening formed through the center of the same through which the downwardly-extending ends of the spring-loop are adapted to extend, means for securing said plate to the knob or handle, the vertical portion of the downwardly-extending ends of the spring-loop extending a sufficient distance below the plate to allow the material composing the cover of the utensil to fit in between the shoulders of the catch and said plate, as specified.

In witness whereof I have hereunto affixed my signature in the presence of two subscribing witnesses.

ALFRED WICKWAR.

Witnesses:
CHAS. J. SCHAEFER,
L. W. MORRISON.